United States Patent Office.

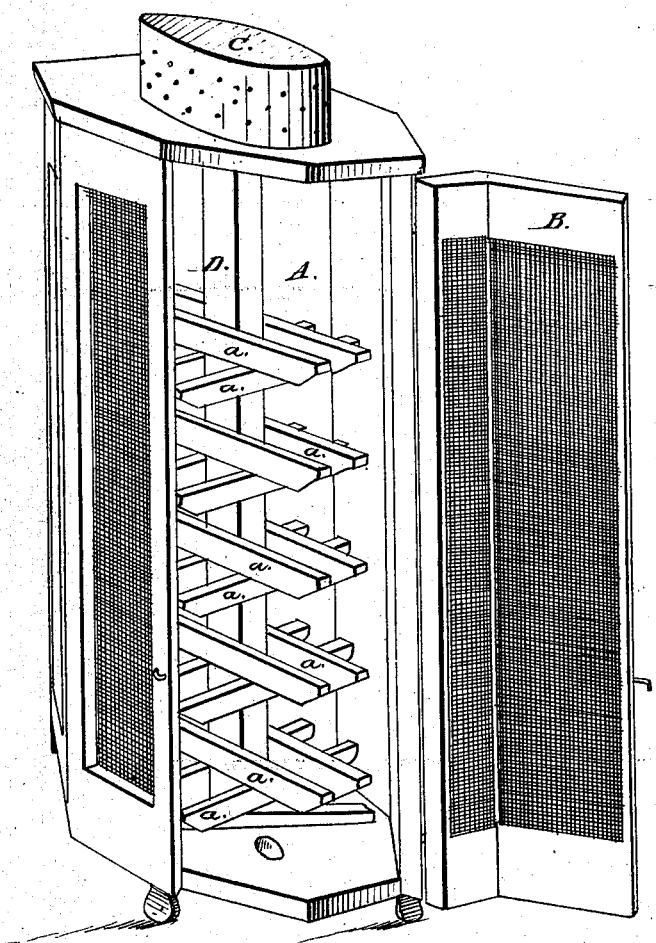

JAMES H. BUSH, OF BENGAL, MICHIGAN.

Letters Patent No. 106,117, dated August 9, 1870.

IMPROVEMENT IN MILK-SAFES.

The Schedule referred to in these Letters Patent and making part of the same.

*To whom it may concern:*

Be it known that I, JAMES H. BUSH, of Bengal, in the county of Clinton and State of Michigan, have invented a new and useful Improvement in Milk-Safes; and I do declare that the following is a true and accurate description thereof, reference being had to the accompanying drawing, and to the letters of reference marked thereon and being a part of this specification.

Figure 1 is a perspective view of my invention.
Figure 2 is a transverse section.
Like letters indicate like parts in each figure.

The nature of this invention relates to the construction of milk-safes; and

Its object is to dispense with a large amount of labor, time, and room employed in handling milk, and to secure the greatest amount of profit from the amount of milk handled.

The invention consists of an octagon or polygonal-shaped safe, of any required size or height, provided with transverse cleats, attached to a center standard or vertical shaft, rotating in the center of said safe, which is provided with proper means for ventilation.

In the drawing—

A represents an octagon chamber, provided with a door, B. The walls of this chamber may be made of proper shaped frame-work, covered with wire or other gauze, and the door properly hinged, and provided with a suitable fastening.

The top and bottom of this chamber should be provided with holes for ventilating purposes, and over the holes in the top may be placed a ventilator, C.

D is an upright square shaft, journaled at top and bottom to the top and bottom of the chamber.

At suitable distances apart are secured to the shaft the transverse cleats a, to form supports upon which to place pans of milk.

I claim the following to be the advantages in a milk-safe of this construction over those ordinarily employed:

By placing the pans upon the cleats, arranged one above another, to as great a height as desirable and convenient, I use the height for room to set the pans, instead of breadth of shelves.

By the use of the cleats the air will strike the bottom of the pan, and rapidly cool the milk down to the proper temperature.

If a leaky pan be placed in the safe, the pans under it will catch the milk and save it, as well as the necessity of cleaning out the safe.

By placing the pans close together around a common center, the air may be brought to bear alike upon them all.

The convenience of the revolving shaft is too plain to need a word of comment. Its journals should be so made that it may be removed when desired.

The means provided for ventilation will let the steam and animal heat in the milk pass off at the top, while the cooler air of the cellar in which the safe should be placed will bring the milk to the right temperature in the shortest time, while the draught from bottom to top will prevent the collection of mold upon the milk.

Should at any time the air be too cold, a lamp or heating apparatus, of any convenient form, may be placed under the safe, when the air warmed thereby will pass upward through the openings in the bottom, and rapidly change the temperature of the milk.

What I claim as my invention, and desire to secure by Letters Patent, is—

The combination of the rotary shaft D, provided with transverse cleats a, octagonal or polygonal chamber A, provided with ventilator C, with an orifice in the floor of said chamber, and with walls covered with wire or other gauze, when the several parts are constructed and arranged to operate as above described.

JAMES H. BUSH.

Witnesses:
E. D. TRIPP,
HENRY M. PERRIN.